(12) United States Patent
Kodama et al.

(10) Patent No.: US 11,637,764 B2
(45) Date of Patent: Apr. 25, 2023

(54) ABNORMALITY DETECTION METHOD AND A NON-TRANSITORY COMPUTER-READABLE STORAGE MEDIUM FOR STORING ABNORMALITY DETECTION PROGRAM

(71) Applicant: FUJITSU LIMITED, Kawasaki (JP)

(72) Inventors: Takeshi Kodama, Yokohama (JP); Ken Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 17/359,802

(22) Filed: Jun. 28, 2021

(65) Prior Publication Data
US 2022/0070074 A1 Mar. 3, 2022

(30) Foreign Application Priority Data
Sep. 2, 2020 (JP) ............................. JP2020-147255

(51) Int. Cl.
*H04L 43/0829* (2022.01)
*H04L 43/08* (2022.01)

(52) U.S. Cl.
CPC .......... *H04L 43/0829* (2013.01); *H04L 43/08* (2013.01)

(58) Field of Classification Search
CPC .... H04L 43/0829; H04L 43/08; H04L 41/147
See application file for complete search history.

(56) References Cited

U.S. PATENT DOCUMENTS

2005/0289395 A1* 12/2005 Katsuyama ............. H04L 47/25
714/25
2014/0355439 A1* 12/2014 Kakadia .............. H04L 41/5025
370/235

(Continued)

FOREIGN PATENT DOCUMENTS

| JP | 2014-127790 A | 7/2014 |
| JP | 2016-149698 A | 8/2016 |
| WO | 2019/142331 A1 | 7/2019 |

OTHER PUBLICATIONS

Zinner, Thomas et al., "A discrete-time model for optimizing the processing time of virtualized network functions", Computer Networks, vol. 125, Apr. 20, 2017, pp. 4-14, XP085201657. (Year: 2017).*

(Continued)

*Primary Examiner* — Brian Whipple
*Assistant Examiner* — James Ross Hollister
(74) *Attorney, Agent, or Firm* — Fujitsu Patent Center

(57) ABSTRACT

A method of an abnormality detection, the method including: calculating an occurrence degree of a packet loss in each of multiple queues on the basis of a first time period in which each of multiple processes that receives a packet is in a waiting state and an arrival frequency of a packet in each of the multiple queues that stores the packets received by the multiple processes; distributing the number of packet losses occurred in a communication device that includes the multiple queues to each of the multiple queues on the basis of the calculated occurrence degree; and determining whether or not an abnormality occurs in each of the multiple processes on the basis of a correspondence relationship between an operation state of each process and the number of packet (Continued)

losses distributed to the queue that corresponds to each process among the multiple queues for each of the multiple processes.

9 Claims, 18 Drawing Sheets

(56) References Cited

U.S. PATENT DOCUMENTS

2016/0241482 A1   8/2016  Tsuruoka
2020/0328976 A1*  10/2020  Koral .................... H04L 43/062
2020/0371858 A1  11/2020  Hayakawa

OTHER PUBLICATIONS

Zinner, Thomas et al., "A discrete-time model for optimizing the processing time of virtualized network functions", Computer Networks, vol. 125, Apr. 20, 2017, pp. 4-14, XP085201657.
Extended European Search Report dated Dec. 2, 2021 for corresponding European Patent Application No. 21180795.3, 10 pages.

* cited by examiner

| TOTAL WAITING TIME (ms) |
|---|
| 3.43 |

| THE NUMBER OF TIMES (TIMES) |
|---|
| 2.9 |

| AVERAGE WAITING TIME (ms) |
|---|
| 1.44 |

FIG. 12

| EXECUTION TIME OF RECEIVING THREAD | | |
|---|---|---|
| RECEIVING THREAD 12a | RECEIVING THREAD 12b | RECEIVING THREAD 12c |
| $W_1$ | $W_2$ | $W_3$ |

⇩ $W_1 < W_2 < W_3$

| ORDER OF THE NUMBERS OF ARRIVED PACKETS |
|---|
| QUEUE 14a < QUEUE 14b < QUEUE 14c |

⇩ THE NUMBER OF ARRIVED PACKETS : N

| THE NUMBER OF ARRIVED PACKETS | | |
|---|---|---|
| QUEUE 14a | QUEUE 14b | QUEUE 14c |
| $n_1$ | $n_2$ | $n_3$ |

| EXECUTION TIME 12a(ms) | EXECUTION TIME 12b (ms) | EXECUTION TIME 12c (ms) |
|---|---|---|
| 224 | 248 | 226 |

| THE NUMBER OF ARRIVALS (ARRIVALS) |
|---|
| 134890 |

| ARRIVAL FREQUENCY 14a (ARRIVALS) | ARRIVAL FREQUENCY 14b (ARRIVALS) | ARRIVAL FREQUENCY 14c (ARRIVALS) |
|---|---|---|
| 43288 | 47927 | 43675 |

| OCCURRENCE DEGREE 14a | OCCURRENCE DEGREE 14b | OCCURRENCE DEGREE 14c |
|---|---|---|
| 62344 | 64192 | 47482 |

| OCCURRENCE DEGREE OF PACKET LOSS | | |
|---|---|---|
| QUEUE 14a | QUEUE 14b | QUEUE 14c |
| $a_1$ | $a_2$ | $a_3$ |

| THE NUMBER OF PACKET LOSSES | | |
|---|---|---|
| QUEUE 14a | QUEUE 14b | QUEUE 14c |
| $m_1$ | $m_2$ | $m_3$ |

| TOTAL NUMBER OF LOSSES (LOSSES) |
|---|
| 24 |

| THE NUMBER OF LOSSES A (LOSSES) | THE NUMBER OF LOSSES (LOSSES) | THE NUMBER OF LOSSES (LOSSES) |
|---|---|---|
| 8.6 | 8.9 | 6.5 |

ABNORMALITY DETECTION METHOD AND A NON-TRANSITORY COMPUTER-READABLE STORAGE MEDIUM FOR STORING ABNORMALITY DETECTION PROGRAM

CROSS-REFERENCE TO RELATED APPLICATION

This application is based upon and claims the benefit of priority of the prior Japanese Patent Application No. 2020-147255, filed on Sep. 2, 2020, the entire contents of which are incorporated herein by reference.

FIELD

The embodiment discussed herein is related to an abnormality detection method and a non-transitory computer-readable storage medium storing an abnormality detection program.

BACKGROUND

In recent years, cloud services for renting containers generated by physical machines, virtual machines (VMs), or the like have been provided.

Specifically, for example, a business operator that provides the cloud service (hereinafter, simply referred to as cloud operator) rents virtual machines and containers (hereinafter, also referred to as virtual machine or the like) to, for example, a user who constructs an information processing system (hereinafter, simply referred to as cloud user). Then, the cloud user operates the information processing system constructed by the virtual machine or the like rent from the cloud operator so as to provide various services, for example, to a user who uses the service (hereinafter, also referred to as service user).

Here, in a case where the cloud service as described above is provided, the cloud operator monitors, for example, a virtual infrastructure used when the virtual machine or the like transmits or receives a packet in view of stably providing a service.

Specifically, for example, the cloud operator, for example, performs anomaly detection for detecting a behavior deviated from a normal behavior as an abnormality so as to detect an abnormality occurred in a virtual infrastructure.

Examples of the related art include International Publication Pamphlet No. WO 2019/142331.

SUMMARY

According to an aspect of the embodiments, there is provided a computer-based method of an abnormality detection. In an example, the method includes: calculating an occurrence degree of a packet loss in each of multiple queues on the basis of a first time period in which each of multiple processes that receives a packet is in a waiting state and an arrival frequency of a packet in each of the multiple queues that stores the packets received by the multiple processes; distributing the number of packet losses occurred in a communication device that includes the multiple queues to each of the multiple queues on the basis of the calculated occurrence degree; and determining whether or not an abnormality occurs in each of the multiple processes on the basis of a correspondence relationship between an operation state of each process and the number of packet losses distributed to the queue that corresponds to each process among the multiple queues for each of the multiple processes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 11A to 11C are diagrams for explaining specific examples of total waiting time information 131, number of times information 132, and average waiting time information 133;

FIG. 12 is a diagram for explaining details of the abnormality detection processing according to the first embodiment;

FIGS. 13A and 13B are diagrams for explaining specific examples of execution time information 134 and number of arrivals information 135;

FIG. 14 is a diagram for explaining a specific example of arrival frequency information 136;

FIG. 16 is a diagram for explaining a specific example of occurrence degree information 137;

FIGS. 18A and 18B are diagrams for explaining specific examples of total number of losses information 138 and number of losses information 139.

DESCRIPTION OF EMBODIMENTS

In a case where the anomaly detection is performed on the virtual infrastructure as described above, an information processing device in which a receiving thread operates (hereinafter, also simply referred to as information processing device) learns, for example, a correlation between a behavior of a receiving thread in a normal state and the number of packet losses occurred in a physical network interface card (hereinafter, also referred to as physical NIC) mounted on the information processing device (own device) (hereinafter, simply referred to as correlation) in advance. Then, for example, in a case of determining that the current correlation is deviated from a range of the correlation that has been learned in advance, the information processing device determines that an abnormality is assumed to occur in the receiving thread.

Here, in a case where the physical NIC mounted on the information processing device is a physical NIC compatible with multi-queue (multi-que compatible NIC), it is preferable for the information processing device to perform the anomaly detection on each receiving thread corresponding to each queue, for example.

However, information that can be acquired from the receiving thread and the physical NIC does not include all pieces of information needed for performing the anomaly detection on each receiving thread. Therefore, in a case where the physical NIC mounted on the information processing device is the multi-que compatible NIC, it is not possible for the information processing device to detect an abnormality in the receiving thread with high accuracy.

Therefore, in one aspect, an object of the embodiment is to provide an abnormality detection method and an abnormality detection program that can detect an abnormality in a receiving thread with high accuracy even in a case where a physical NIC compatible with multi-queue is used.

[Configuration of Information Processing System]

Figure 1:
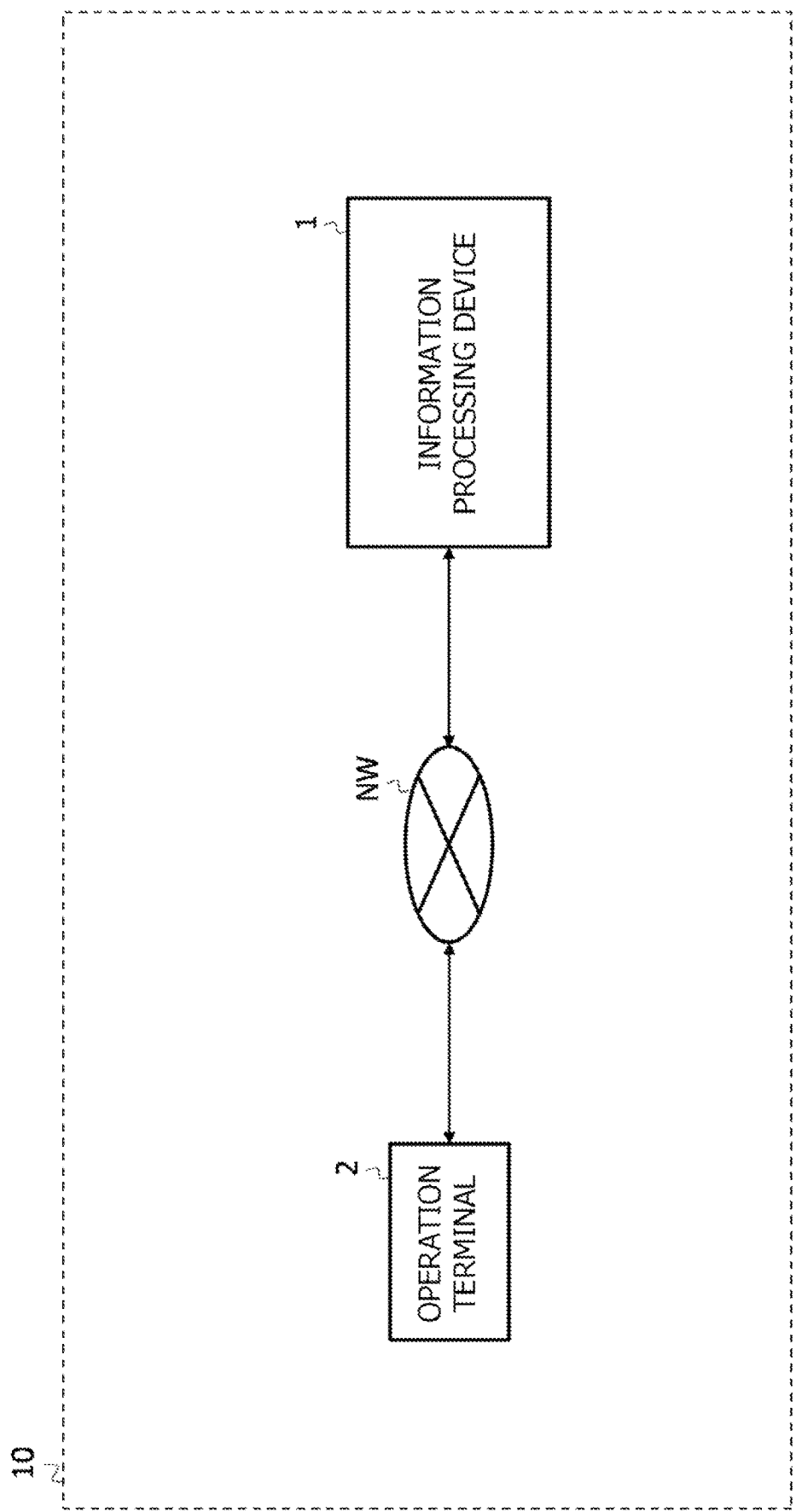
FIG. 1 is a diagram for explaining a configuration of an information processing system 10.

First, a configuration of an information processing system 10 will be described. FIG. 1 is a diagram for explaining the configuration of the information processing system 10.

The information processing system 10 illustrated in FIG. 1 includes an information processing device 1 and an operation terminal 2 to which a cloud operator inputs necessary information or the like. The operation terminal 2 can access the information processing device 1 via a network NW such as the Internet.

In the information processing device 1, for example, one or more physical machines, managed by the cloud operator, such as virtual machines (not illustrated) to be rent to cloud users or the like operate. Then, the cloud user provides various services to service providers using the virtual machines or the like rent from the cloud operator.

Furthermore, from the viewpoint of stably providing the cloud service, the information processing device 1 monitors virtual infrastructures by performing anomaly detection. Specifically, for example, the information processing device 1 monitors behaviors of a receiving thread, for example, by performing anomaly detection. Hereinafter, a specific example of the configuration of the information processing device 1 will be described.

[Specific Example of Configuration of Information Processing Device]

Figure 2:
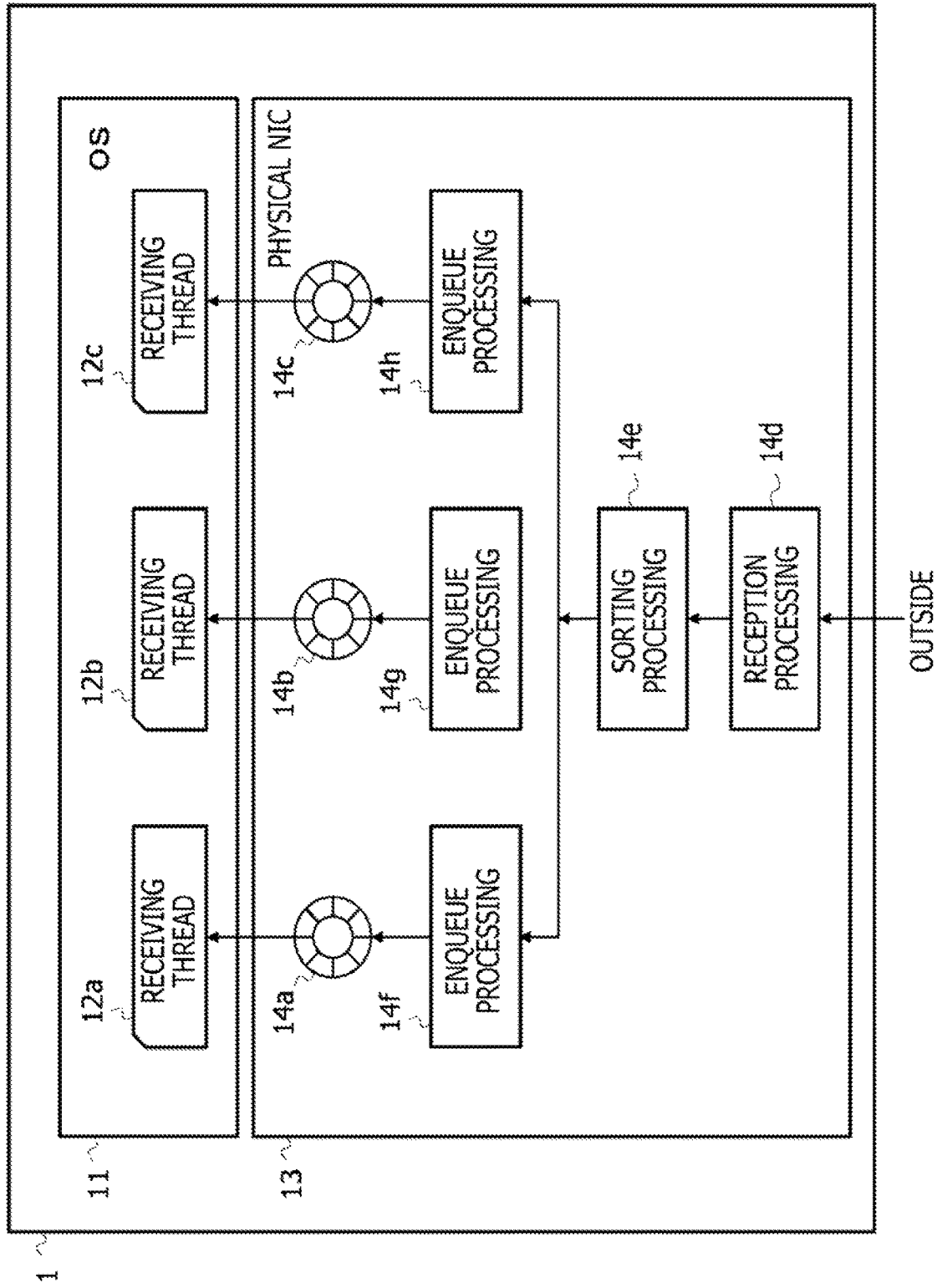
FIG. 2 is a diagram for explaining a specific example of a configuration of an information processing device 1.

FIG. 2 is a diagram for explaining the specific example of the configuration of the information processing device 1.

In the example illustrated in FIG. 2, a physical NIC 13 attached to the information processing device 1 includes queues 14a, 14b, and 14c (hereinafter, also collectively referred to as queue 14) that are RING buffers for storing packets.

Furthermore, the physical NIC 13 executes reception processing 14d that is processing for receiving packets transmitted from outside (for example, network NW) and sorting processing 14e for sorting the packets received in the reception processing 14d. Moreover, the physical NIC 13 executes enqueue processing 14f, 14g, and 14h for respectively storing the packets sorted in the sorting processing 14e in the queues 14a, 14b, and 14c. Note that, in the example illustrated in FIG. 2, the enqueue processing 14f is processing for storing the packet in the queue 14a, the enqueue processing 14g is processing for storing the packet in the queue 14b, and the enqueue processing 14h is processing for storing the packet in the queue 14c.

Furthermore, in the example illustrated in FIG. 2, in an operating system (OS) 11 of the information processing device 1, receiving threads 12a, 12b, and 12c (hereinafter, also collectively referred to as receiving thread 12) operate that are processes for extracting the packets stored in the queues 14a, 14b, and 14c and transferring the packets to destination virtual machines or the like. In the example in FIG. 2, the receiving thread 12a extracts the packet stored in the queue 14a, the receiving thread 12b extracts the packet stored in the queue 14b, and the receiving thread 12c extracts the packet stored in the queue 14c.

In other words, for example, the physical NIC 13 illustrated in FIG. 2 is a multi-que compatible NIC including three queues. Therefore, in this case, the information processing device 1 makes the receiving threads 12a, 12b, and 12c in the OS 11 operate in parallel so that processing associated with the reception of the packet transmitted from outside is executed at high speed.

Here, in a case where the information processing device 1 includes the physical NIC 13 that is the multi-que compatible NIC as described above, it is preferable to perform the anomaly detection performed on the receiving thread 12 for each receiving thread 12. Hereinafter, a specific example of the anomaly detection on the receiving thread 12 will be described.

[Specific Example of Anomaly Detection of Receiving Thread]

Figure 3:
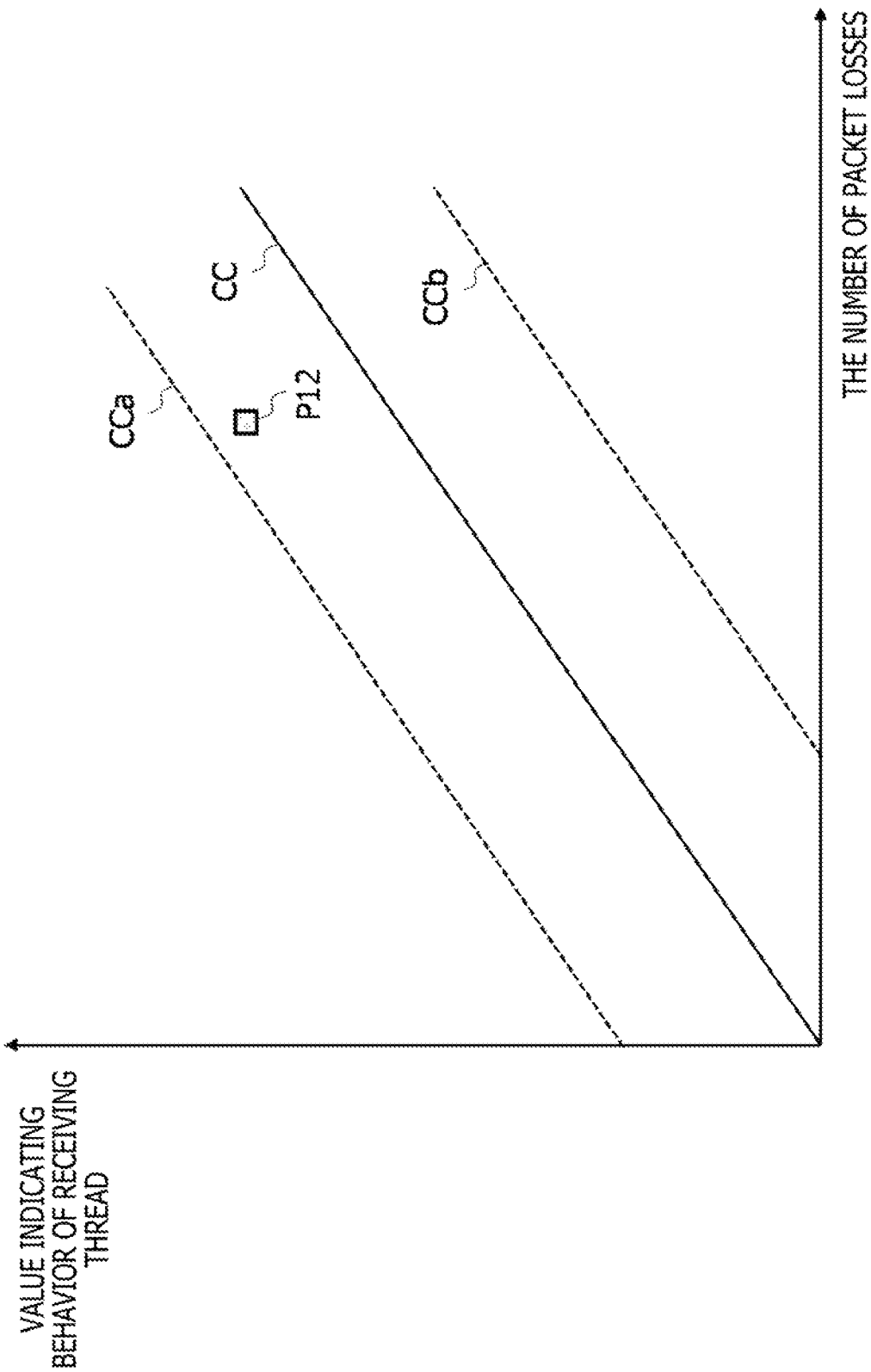
FIG. 3 is a diagram for explaining a specific example of anomaly detection of a receiving thread 12.
Figure 4:
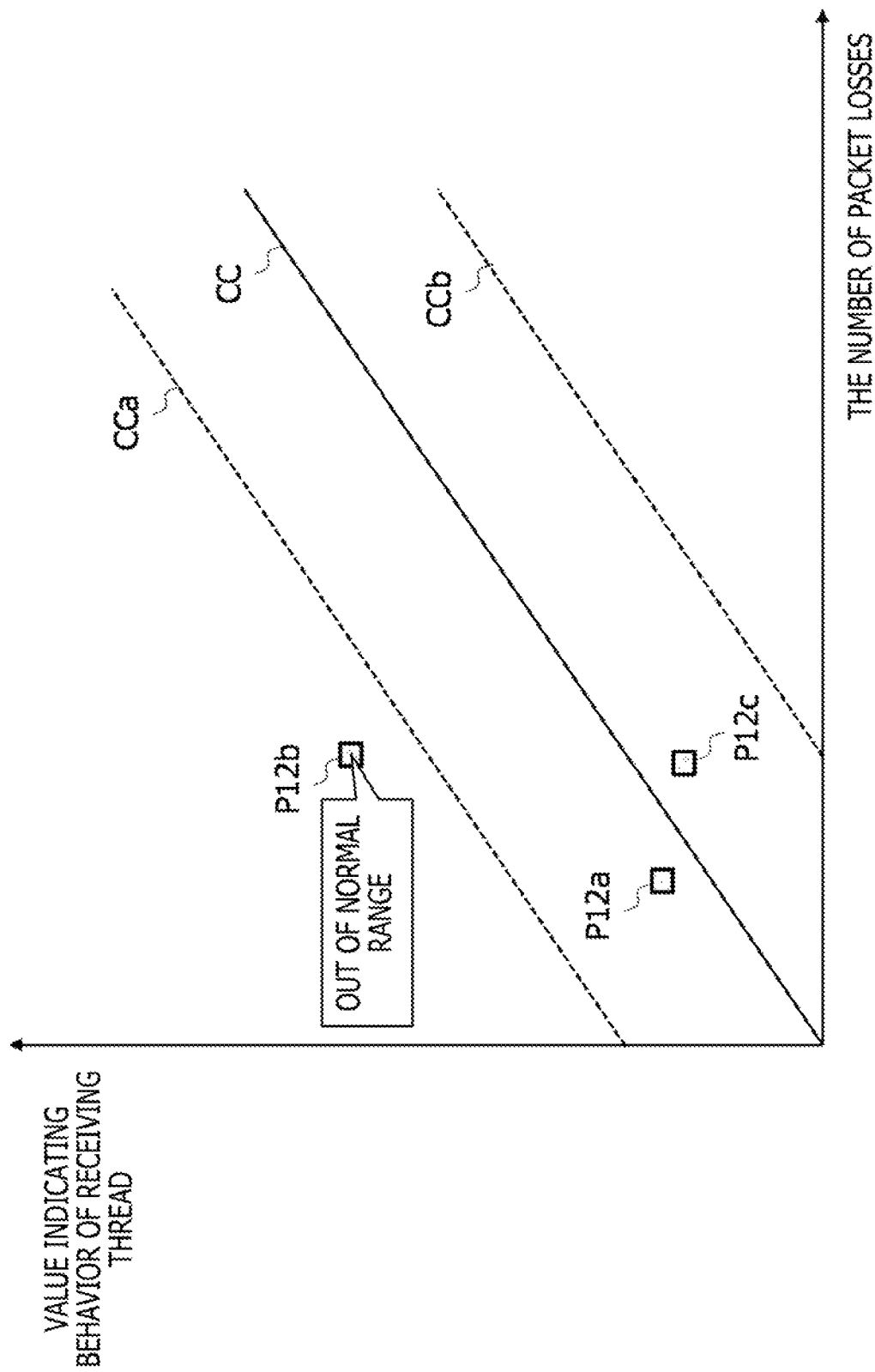
FIG. 4 is a diagram for explaining a specific example in a case where anomaly detection is performed on each receiving thread 12.

FIGS. 3 and 4 are diagrams for explaining specific examples of the anomaly detection on the receiving thread 12. Specifically, for example, FIG. 3 is a diagram for explaining a specific example in a case where the anomaly detection is performed on the entire receiving thread 12, and FIG. 4 is a diagram for explaining a specific example in a case where the anomaly detection is performed on each receiving thread 12.

In the graph illustrated in FIG. 3 or the like, the horizontal axis indicates the number of packet losses, and the vertical axis indicates a value indicating a behavior of the receiving thread 12. Furthermore, in the example illustrated in FIG. 3 or the like, a straight line CC is a straight line specified by learning a correlation between a behavior of the receiving thread 12 in a normal state and the number of packet losses of the physical NIC 13. Moreover, in the example illustrated in FIG. 3 or the like, a straight line CCa indicates a straight line that indicates an upper limit of a range where it can be determined that the correlation is normal, and a straight line CCb is a straight line that indicates a lower limit of the range where it can be determined that the correlation is normal.

Specifically, for example, in the example illustrated in FIG. 3, a point P12 corresponding to a value indicating the behavior of the entire receiving thread 12 (total value of values indicating behaviors of respective receiving threads 12) and the number of packet losses occurred in the entire physical NIC 13 is included in a region between the straight lines CCa and CCb. Therefore, in this case, the information processing device 1 determines that an abnormality is not assumed to occur in the receiving thread 12.

On the other hand, in the example illustrated in FIG. 4, a point P12a corresponding to a value indicating a behavior of the receiving thread 12a and the number of packet losses occurred in the queue 14a and a point P12c corresponding to a value indicating a behavior of the receiving thread 12c and the number of packet losses occurred in the queue 14c are included in the region between the straight lines CCa and CCb. However, a point P12b corresponding to a value indicating a behavior of the receiving thread 12b and the number of packet losses occurred in the queue 14b is not included in the region between the straight lines CCa and CCb. Therefore, in this case, the information processing device 1 determines that an abnormality is assumed to occur in the receiving thread 12b.

In other words, for example, as described with reference to FIG. 3, in a case where the anomaly detection is performed on the entire receiving thread 12, there is a possibility that it is not possible to detect an abnormality that occurs in a part of the receiving thread 12. Therefore, in a case where the information processing device 1 includes the physical NIC 13 that is the multi-que compatible NIC as illustrated in FIG. 2, it is preferable to perform the anomaly detection on each receiving thread 12, rather than performing the anomaly detection on the entire receiving thread 12.

However, information that can be acquired from the OS 11 and the physical NIC 13 does not include all pieces of information needed for performing the anomaly detection on each receiving thread 12. Specifically, for example, it is not possible for the information processing device 1 to acquire the number of packet losses occurred in each queue 14.

Therefore, there is a case where it is not possible for the information processing device 1 to perform the anomaly detection on each receiving thread 12 and to detect an abnormality in the receiving thread 12 with high accuracy.

Therefore, the information processing device 1 according to the present embodiment calculates a packet loss occurrence degree (probability of occurrence of packet loss) in each of the multiple queues 14 on the basis of a time period when each of the receiving threads 12 is in a waiting state (hereinafter, also referred to as first time period) or a packet arrival frequency of each of the multiple queues 14 that stores the packets received by the multiple receiving threads 12.

Then, the information processing device 1 distributes the number of packet losses occurred in the physical NIC 13 in which the multiple queues 14 operates to each of the multiple queues 14 on the basis of the calculated occurrence degree.

Thereafter, the information processing device 1 determines whether or not an abnormality occurs in the multiple receiving threads 12 on the basis of a correspondence relationship between an operation state of each receiving thread 12 and the number of packet losses distributed to the queue 14 corresponding to each process among the multiple queues 14 for each of multiple receiving threads 12.

In other words, for example, the information processing device 1 according to the present embodiment estimates the number of packet losses occurred in each queue 14 from the information that can be acquired from the OS 11 and the physical NIC 13. Specifically, for example, the information processing device 1 estimates the number of packet losses occurred in each queue 14, for example, by combining the information that can be acquired from the OS 11 and the information that can be acquired from the physical NIC 13. Then, the information processing device 1 performs the anomaly detection on each receiving thread 12 using the estimated value of the number of packet losses in each queue 14.

As a result, the information processing device 1 according to the present embodiment can perform the anomaly detection on each receiving thread 12 even in a case where the physical NIC 13 compatible with a multi-queue is used. Therefore, the information processing device 1 can detect an abnormality in the receiving thread 12 with high accuracy.

[Hardware Configuration of Information Processing System]

Figure 5:
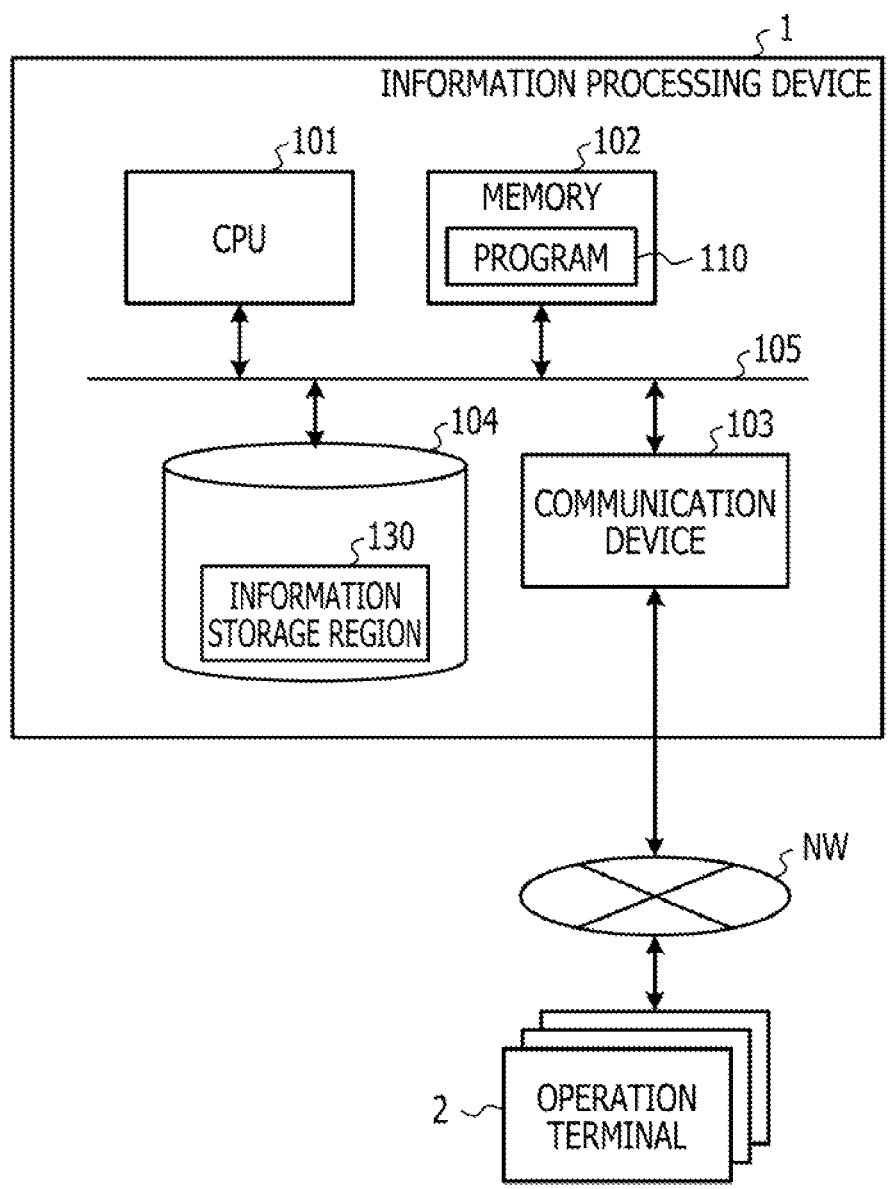
FIG. 5 is a diagram for explaining a hardware configuration of the information processing device 1.

Next, a hardware configuration of the information processing system 10 will be described. FIG. 5 is a diagram for explaining the hardware configuration of the information processing device 1.

As illustrated in FIG. 5, the information processing device 1 includes a CPU 101 as a processor, a memory 102, a communication device 103, and a storage medium 104. Each of the units is connected to each other via a bus 105.

The storage medium 104 has, for example, a program storage region (not illustrated) where a program 110 that executes processing for performing the anomaly detection on each receiving thread 12 (hereinafter, also referred to as abnormality detection processing) is stored. Furthermore, the storage medium 104 includes, for example, an information storage region 130 where information used when the abnormality detection processing is executed is stored. Note that the storage medium 104 may be, for example, a hard disk drive (HDD) or a solid state drive (SSD).

The CPU 101 executes the program 110 loaded from the storage medium 104 into the memory 102 to execute the abnormality detection processing.

Furthermore, the communication device 103 communicates with the operation terminal 2 via the network NW, for example.

[Functions of Information Processing System]

Figure 6:
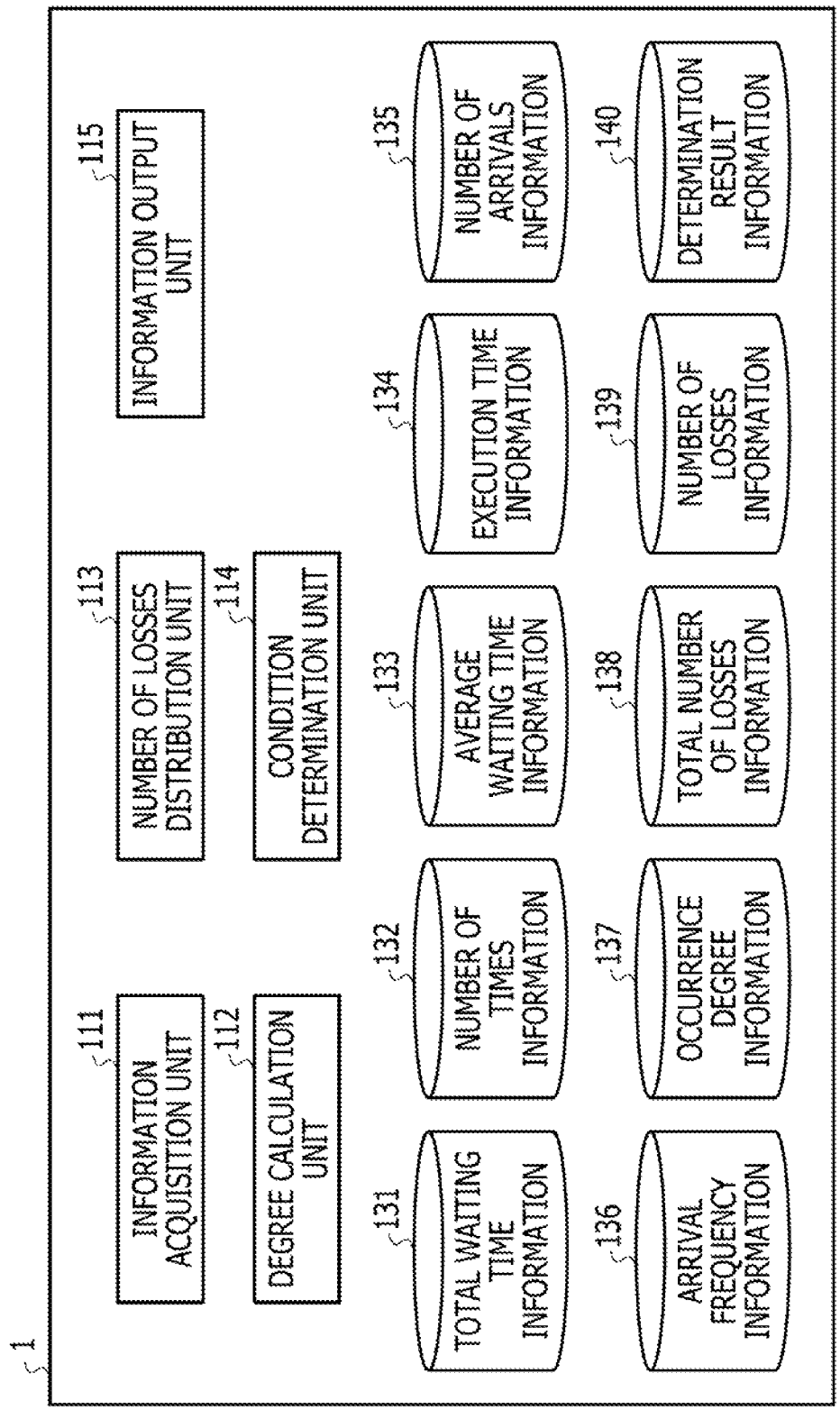
FIG. 6 is a block diagram of functions of the information processing device 1.

Next, functions of the information processing system 10 will be described. FIG. 6 is a block diagram of the functions of the information processing device 1.

As illustrated in FIG. 6, for example, the information processing device 1 implements various functions including an information acquisition unit 111, a degree calculation unit 112, a number of losses distribution unit 113, a condition determination unit 114, and an information output unit 115 through organic collaboration between hardware such as the CPU 101 or the memory 102 and the program 110.

Furthermore, for example, as illustrated in FIG. 6, the information processing device 1 stores total waiting time information 131, number of times information 132, average waiting time information 133, execution time information 134, number of arrivals information 135, arrival frequency information 136, occurrence degree information 137, total number of losses information 138, number of losses information 139, and determination result information 140 in the information storage region 130.

The information acquisition unit 111 acquires the total waiting time information 131 that indicates a total time of a time when each receiving thread 12 is in a waiting state within a predetermined time from the OS 11 (each receiving thread 12). The predetermined time may be, for example, a time of three minutes or the like.

Furthermore, the information acquisition unit 111 acquires the number of times information 132 indicating the number of times when an execution state of each receiving thread 12 is switched to the waiting state within a predetermined period from the OS 11 (each receiving thread 12).

Furthermore, the information acquisition unit 111 acquires the execution time information 134 indicating an execution time (hereinafter, also referred to as second time period) when each receiving thread 12 is in the execution state within the predetermined period from the OS 11 (each receiving thread 12).

Furthermore, the information acquisition unit 111 acquires the number of arrivals information 135 indicating the total number of packets that have arrived at the physical NIC 13 from outside the information processing device 1 from the physical NIC 13.

Furthermore, the information acquisition unit 111 acquires the total number of losses information 138 indicating the number of packet losses occurred in the physical NIC 13 from the physical NIC 13.

The degree calculation unit 112 acquires, for each receiving thread 12, the average waiting time information 133 that is calculated by dividing the total time indicated by the total waiting time information 131 corresponding to each receiving thread 12 by the number of times indicated by the number of times information 132 corresponding to each receiving thread 12. In other words, for example, the average waiting time information 133 is information indicating an average time of the waiting time in a case where the execution state of each receiving thread 12 is switched to the waiting state.

Furthermore, the degree calculation unit 112 acquires, for each receiving thread 12, a rate calculated by dividing an execution time indicated by the execution time information 134 corresponding to each receiving thread by a total value of the execution times indicated by the execution time information 134 corresponding all the receiving threads 12. Then, the degree calculation unit 112 acquires, for each queue 14, a product of the ratio of the receiving thread 12 corresponding to each queue 14 and the total number of packets indicated by the number of arrivals information 135 as the arrival frequency information 136 that indicates an arrival frequency of the packets at each queue 14.

Furthermore, the degree calculation unit 112 acquires, for each queue 14, an occurrence degree of the packet loss (probability of occurrence of packet loss) in each queue 14 as the occurrence degree information 137 on the basis of the average time indicated by the average waiting time information 133 regarding the receiving thread 12 corresponding to each queue 14 or the arrival frequency indicated by the arrival frequency information 136 of each queue 14.

Specifically, for example, the degree calculation unit 112 acquires, for each queue 14, a product of the average time indicated by the average waiting time information 133 regarding the receiving thread 12 corresponding to each queue 14 and the arrival frequency indicated by the arrival frequency information 136 of each queue 14 as the occurrence degree information 137 that indicates the occurrence degree of the packet loss in each queue 14.

For each queue 14, the number of losses distribution unit 113 acquires a rate calculated by dividing the occurrence degree indicated by the occurrence degree information 137 corresponding to each queue 14 by the total value of the occurrence degrees indicated by the occurrence degree information 137 corresponding to all the queues 14. Then, for each queue 14, the number of losses distribution unit 113 acquires a product of the rate corresponding to each queue 14 and the number of packet losses indicated by the total number of losses information 138 as the number of losses information 139 indicating the number of packet losses corresponding to each queue 14 (estimated value of the number of packet losses).

The condition determination unit 114 determines whether or not an abnormality occurs in each receiving thread 12 on the basis of the correspondence relationship between the operation state of each receiving thread 12 and the number of packet losses of the queue 14 corresponding to each receiving thread 12 (the number of packet losses corresponding to the number of losses information 139) for each receiving thread 12.

The information output unit 115 outputs, for example, the determination result information 140 that indicates the result of the determination made by the condition determination unit 114 to the operation terminal 2.

Note that each of the information acquisition unit 111, the degree calculation unit 112, the number of losses distribution unit 113, the condition determination unit 114, and the information output unit 115 may be a function of the OS 11 or a function of an application that operates on the OS 11.

Outline of First Embodiment

Figure 7:
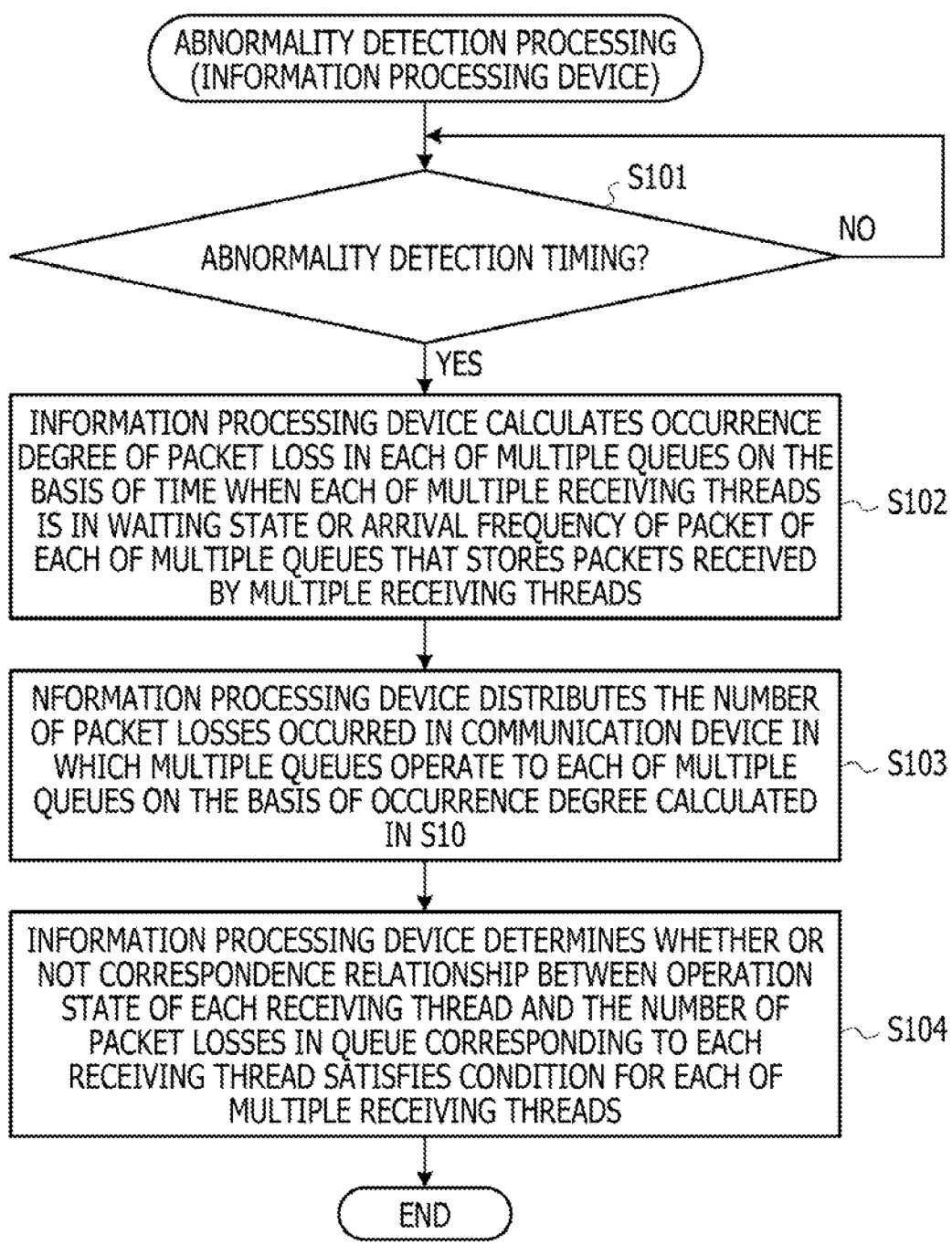
FIG. 7 is a flowchart for explaining an outline of abnormality detection processing according to a first embodiment.

Next, an outline of a first embodiment will be described. FIG. 7 is a flowchart for explaining an outline of abnormality detection processing according to the first embodiment.

As illustrated in FIG. 7, the information processing device 1 waits until an abnormality detection timing comes (NO in S101). The abnormality detection timing may be, for example, a timing when information indicating that a business operator executes the abnormality detection processing is input to the information processing device 1. Furthermore, the abnormality detection timing may be, for example, every predetermined time such as 10 minutes.

Then, in a case where the abnormality detection timing comes (YES in S101), the information processing device 1 calculates the occurrence degree of the packet loss in each of the multiple queues 14 on the basis of the time when each of the multiple receiving threads 12 is in the waiting state or the arrival frequency of the packet of each of the multiple queues 14 that stores the packets received by each of the multiple receiving threads 12 (S102).

Subsequently, the information processing device 1 distributes the number of packet losses occurred in the physical NIC 13 in which the multiple queues 14 operates to each of the multiple queues 14 on the basis of the occurrence degree calculated in the processing in S102 (S103).

Thereafter, for each of the multiple receiving threads 12, the information processing device 1 determines whether or not the correspondence relationship between the operation state of each receiving thread 12 and the number of packet losses in the queue 14 corresponding to each receiving thread 12 satisfies a predetermined condition (S104).

In other words, for example, the information processing device 1 according to the present embodiment estimates the number of packet losses occurred in each queue 14 from the information that can be acquired from the OS 11 and the physical NIC 13. Specifically, for example, the information processing device 1 estimates the number of packet losses occurred in each queue 14, for example, by combining the information that can be acquired from the OS 11 and the information that can be acquired from the physical NIC 13. Then, the information processing device 1 performs the anomaly detection on each receiving thread 12 using the estimated value of the number of packet losses in each queue 14.

As a result, the information processing device 1 according to the present embodiment can perform the anomaly detection on each receiving thread 12 even in a case where the physical NIC 13 compatible with a multi-queue is used.

Therefore, the information processing device 1 can detect abnormality in the receiving thread 12 with high accuracy.

Details of First Embodiment

Figure 8:
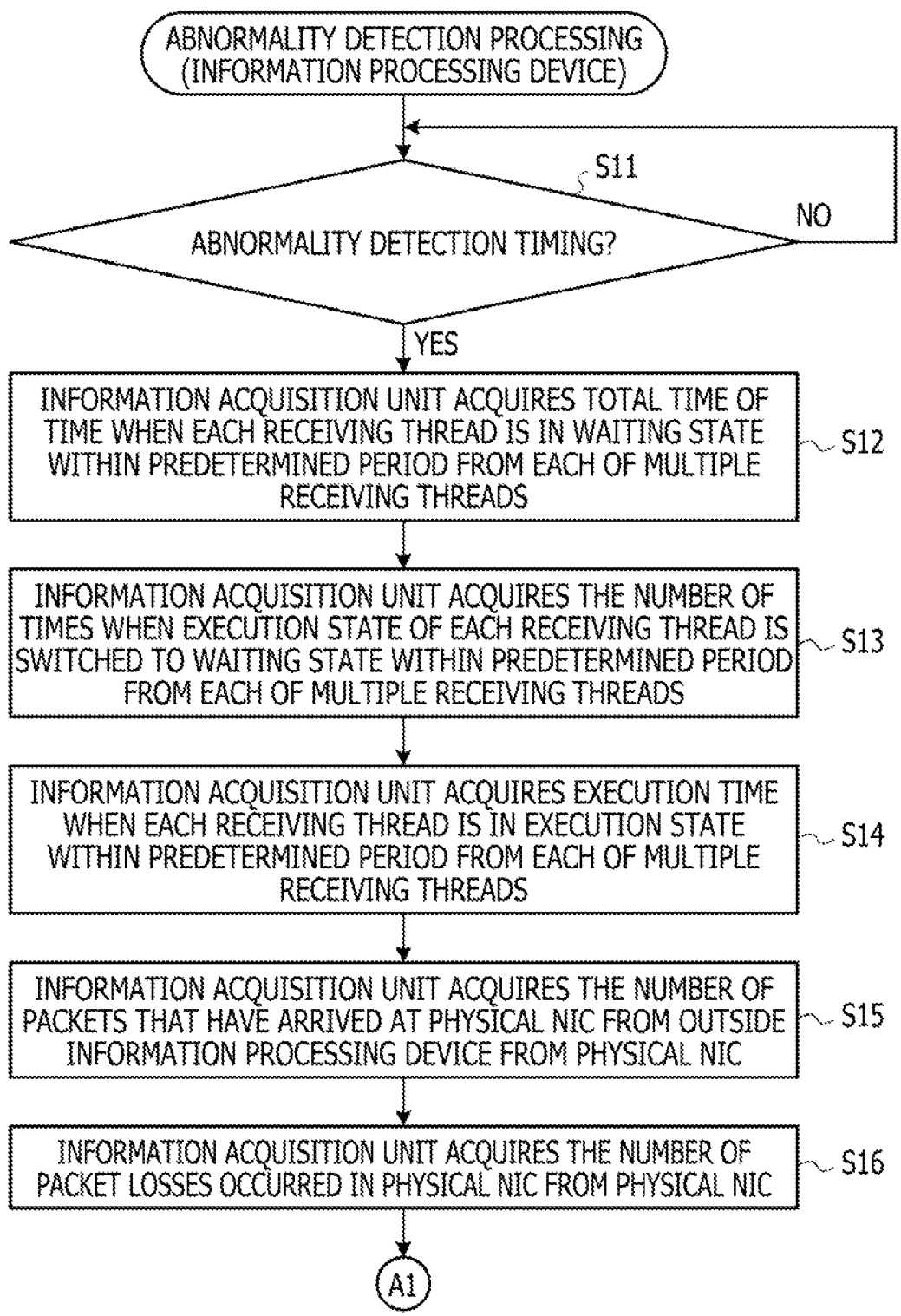
FIG. 8 is a flowchart for explaining details of the abnormality detection processing according to the first embodiment.
Figure 9:
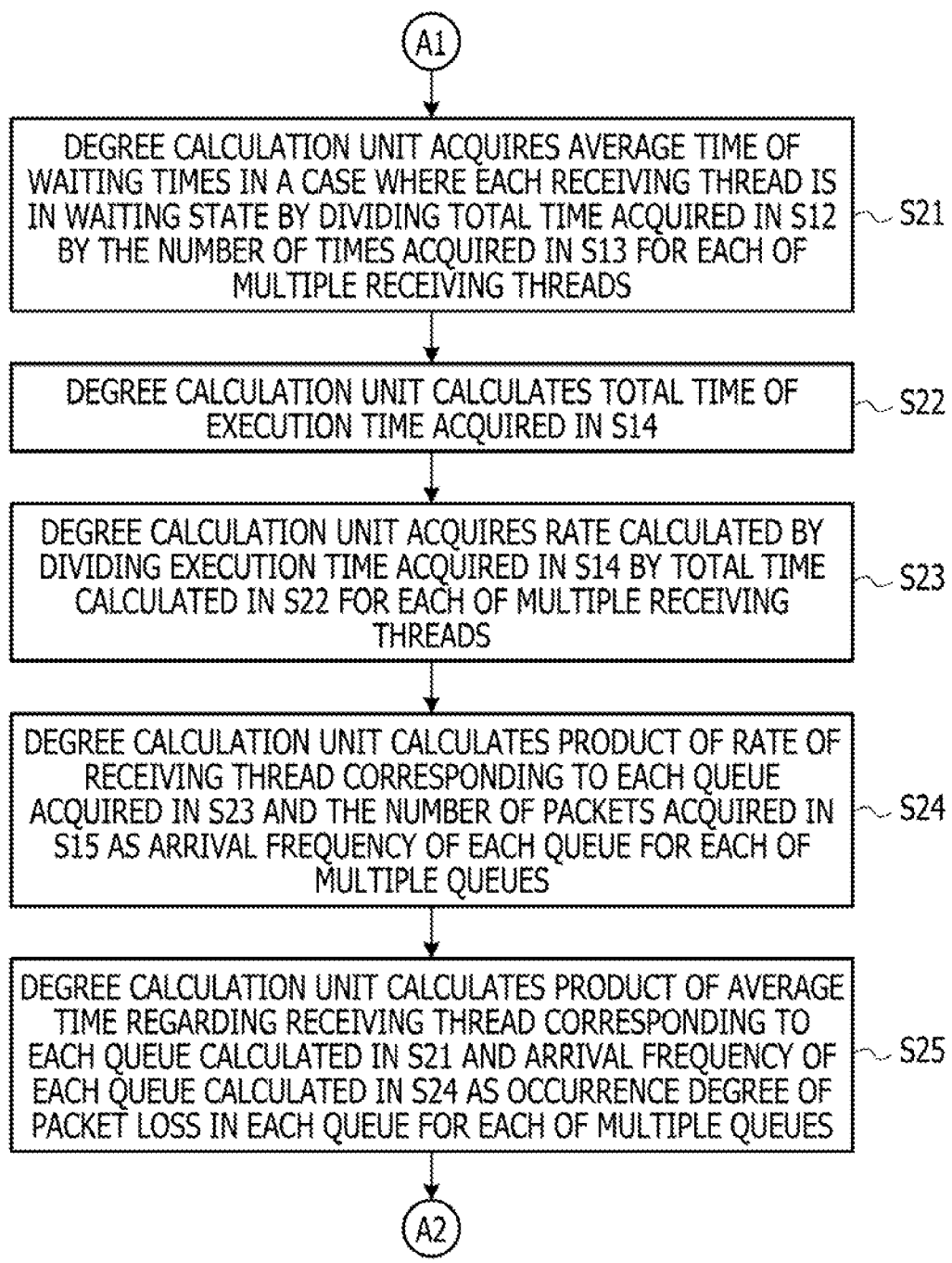
FIG. 9 is a flowchart for explaining details of the abnormality detection processing according to the first embodiment.
Figure 10:
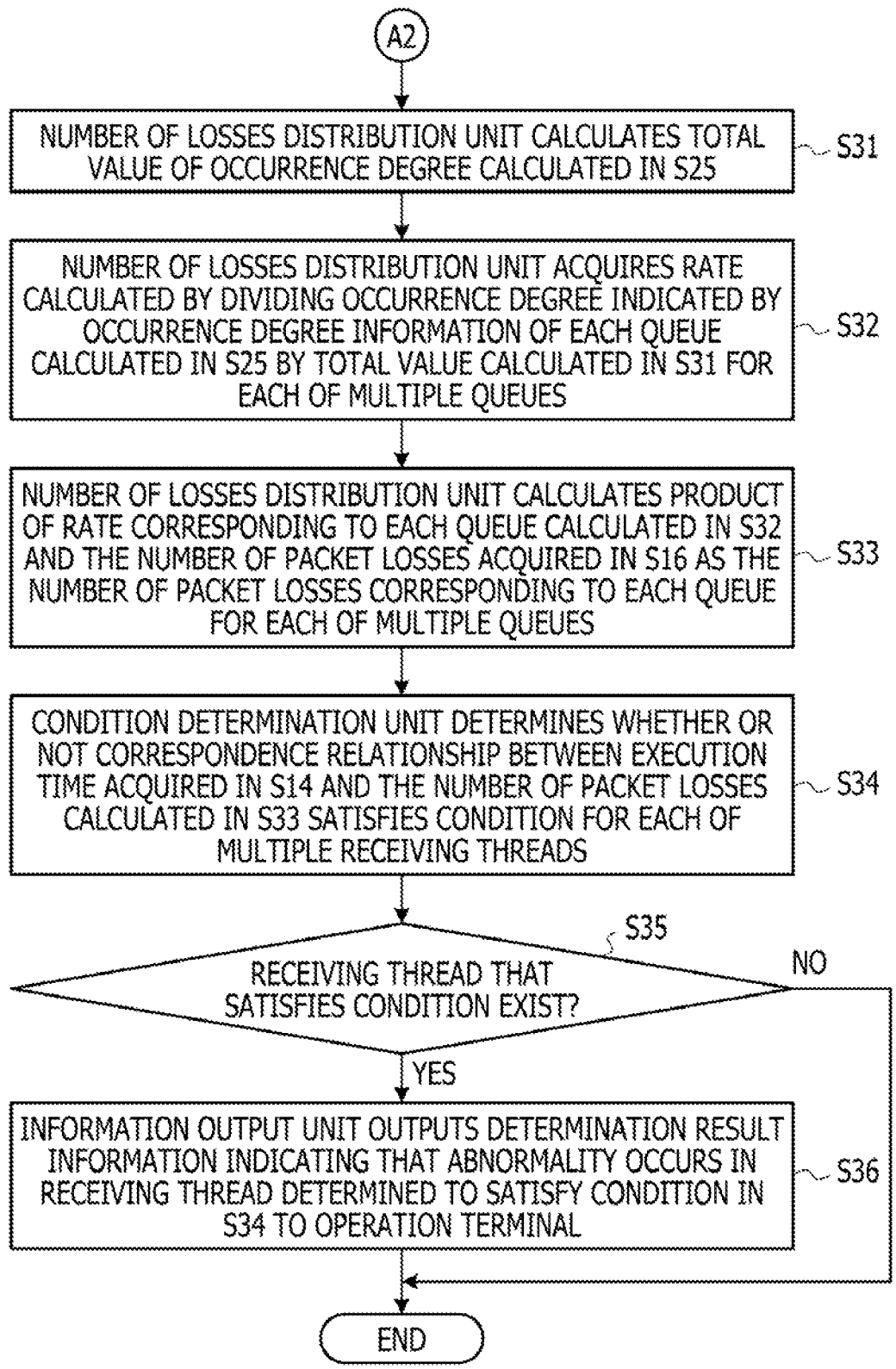
FIG. 10 is a flowchart for explaining details of the abnormality detection processing according to the first embodiment.

Next, details of the first embodiment will be described. FIGS. 8 to 10 are flowcharts for explaining details of the abnormality detection processing according to the first embodiment. Furthermore, FIGS. 11A to 18B are diagrams for explaining details of the abnormality detection processing according to the first embodiment.

Note that, hereinafter, a case where abnormality detection is performed on all the receiving threads 12 will be described. However, abnormality detection may be performed on only one of the receiving threads 12 (for example, receiving thread 12 specified by business operator).

As illustrated in FIG. 8, the information acquisition unit 111 of the information processing device 1 waits until the abnormality detection timing comes (NO in S11).

Then, in a case where the abnormality detection timing comes (YES in S11), the information acquisition unit 111 acquires the total waiting time information 131 that indicates a total time of a time when each receiving thread 12 is in a waiting state within a predetermined time from the OS 11 (each of multiple receiving threads 12) (S12).

Furthermore, in this case, the information acquisition unit 111 acquires the number of times information 132 indicating the number of times when an execution state of each receiving thread 12 is switched to the waiting state within a predetermined period from the OS 11 (each of multiple receiving threads 12) (S13).

Furthermore, in this case, the information acquisition unit 111 acquires the execution time information 134 indicating an execution time when each receiving thread 12 is in the execution state within the predetermined period from the OS 11 (each of multiple receiving threads 12) (S14).

Furthermore, in this case, the information acquisition unit 111 acquires the number of arrivals information 135 indicating the total number of packets that have arrived at the physical NIC 13 from outside the information processing device 1 from the physical NIC 13 (S15).

Moreover, in this case, the information acquisition unit 111 acquires the total number of losses information 138 indicating the number of packet losses in the physical NIC 13 from the physical NIC 13 (S16).

Then, as illustrated in FIG. 9, the degree calculation unit 112 of the information processing device 1 acquires the average waiting time information 133 that indicates an average time of the waiting times in a case where the execution state of each receiving thread 12 is switched to the waiting state by dividing the total time indicated by the total waiting time information 131 acquired in the processing in S12 by the number of times indicated by the number of times information 132 acquired in the processing in S13 for each of multiple receiving threads 12 (S21). Hereinafter, a specific example of the processing in S21 will be described.

[Specific Example of Processing in S21]

FIGS. 11A to 11C are diagrams for explaining specific examples of the total waiting time information 131, the number of times information 132, and the average waiting time information 133. FIG. 11A is a diagram for explaining a specific example of the total waiting time information 131, FIG. 11B is a diagram for explaining a specific example of the number of times information 132, and FIG. 11C is a diagram for explaining a specific example of the average waiting time information 133. Note that the total waiting time information 131 and the number of times information 132 illustrated in FIGS. 11A and 11B are specific examples of acquired information about one of the receiving threads 12. The average waiting time information 133 illustrated in FIG. 11C is a specific example of calculated information about one of the receiving threads 12.

Specifically, for example, "3.43 (ms)" is set to the total waiting time information 131 illustrated in FIG. 11A, and "2.9 (times)" is set to the number of times information 132 illustrated in FIG. 11B.

Therefore, in this case, the degree calculation unit 112 acquires "1.44 (ms)" calculated by dividing "3.43 (ms)" by "2.9 (times)" as the average waiting time information 133 as illustrated in FIG. 11C.

Returning to FIG. 9, the degree calculation unit 112 calculates a total time of the execution time indicated by the execution time information 134 acquired in the processing in S14 (S22).

Then, the degree calculation unit 112 acquires a rate calculated by dividing the execution time indicated by the execution time information 134 acquired in the processing in S14 by the total time calculated in the processing in S22 for each of multiple receiving threads 12 (S23).

Thereafter, the degree calculation unit 112 calculates a product of the rate of the receiving thread 12 corresponding to each queue 14 acquired in the processing in S23 and the total number of packets indicated by the number of arrivals information 135 acquired in the processing in S15 as the arrival frequency information 136 that indicates the arrival frequency of each queue 14 for each of multiple queues 14 (S24).

In other words, for example, it can be determined that the receiving thread 12 of which the execution time is longer than those of other receiving threads 12 processes more packets than the other receiving threads 12. Therefore, it can be determined that the more packets arrive at the queue 14 corresponding to the receiving thread 12 that processes more packets than the other receiving threads 12 than the other queues 14.

Specifically, as illustrated in FIG. 12, for example, in a case where the execution times of the respective receiving threads 12a, 12b, and 12c are "$W_1$", "$W_2$", and "$W_3$" and the execution times correspond to longer times in the order of "$W_3$", "$W_2$", and "$W_1$", the order of the numbers of arrived packets is the order of the queues 14c, 14b, and 14a.

Therefore, for example, the degree calculation unit 112 distributes the number of arrived packets of the physical NIC 13 to each queue 14 so that a ratio of the numbers of the arrived packets of the respective queues 14 is equal to a ratio of the lengths of the execution times of the respective receiving threads 12.

Specifically, as illustrated in FIG. 12, for example, in a case where the number of arrived packets of the physical NIC 13 is "N", the degree calculation unit 112 calculates each of "$n_1$", "$n_2$", and "$n_3$" so that a ratio of "$n_1$", "$n_2$", and "$n_3$" that are the numbers of arrived packets of the respective queues 14a, 14b, and 14c is equal to a ratio of "$W_1$", "$W_2$", and "$W_3$".

As a result, the degree calculation unit 112 can estimate the number of arriving packets of each queue 14.

Note that the degree calculation unit 112 may calculate the arrival frequency information 136 by further dividing the product of the rate of the receiving thread 12 corresponding to each queue 14 acquired in the processing in S23 and the total number of packets indicated by the number of arrivals information 135 acquired in the processing in S15 by the predetermined time used in the processing in S12 or the like. Hereinafter, a specific example of the processing in S24 will be described.

[Specific Example of Processing in S24]

FIGS. 13A and 13B are diagrams for explaining specific examples of the execution time information 134 and the number of arrivals information 135. FIG. 13A is a diagram for explaining a specific example of the execution time information 134, and FIG. 13B is a diagram for explaining a specific example of the number of arrivals information 135. Furthermore, FIG. 14 is a diagram for explaining a specific example of the arrival frequency information 136.

Specifically, for example, in the execution time information 134 illustrated in FIG. 13A, "224 (ms)" is set to an "execution time 12a" indicating the execution time of the receiving thread 12a, "248 (ms)" is set to an "execution time 12b", and "226 (ms)" is set to an "execution time 12c". Furthermore, "134890" is set to the number of arrivals information 135 illustrated in FIG. 13B.

Therefore, in the processing in S22, the degree calculation unit 112 calculates "698 (ms)" that is a total of "224 (ms)" that is the execution time of the receiving thread 12a, "248 (ms)" that is the execution time of the receiving thread 12b, and "226 (ms)" that is the execution time of the receiving thread 12c.

Then, in the processing in S23 and S24, for example, the degree calculation unit 112 calculates "43288" calculated by dividing "248 (ms)" that is the execution time of the receiving thread 12a by the total value "698 (ms)" calculated in the processing in S22 and further multiplying "134890" indicated by the number of arrivals information 135 as the arrival frequency of the queue 14a corresponding to the receiving thread 12a.

Thereafter, for example, as illustrated in FIG. 14, the degree calculation unit 112 sets "43288" to an "arrival frequency 14a" that indicates the arrival frequency of the queue 14a.

Returning to FIG. 9, for each of multiple queues 14, the degree calculation unit 112 calculates a product of the average time indicated by the average waiting time information 133 of the receiving thread 12 corresponding to each queue 14 acquired in the processing in S21 and the arrival frequency indicated by the arrival frequency information 136 corresponding to each queue 14 calculated in the processing in S24 as the occurrence degree information 137 that indicates the occurrence degree of the packet loss in each queue 14 (S25).

Figure 15:
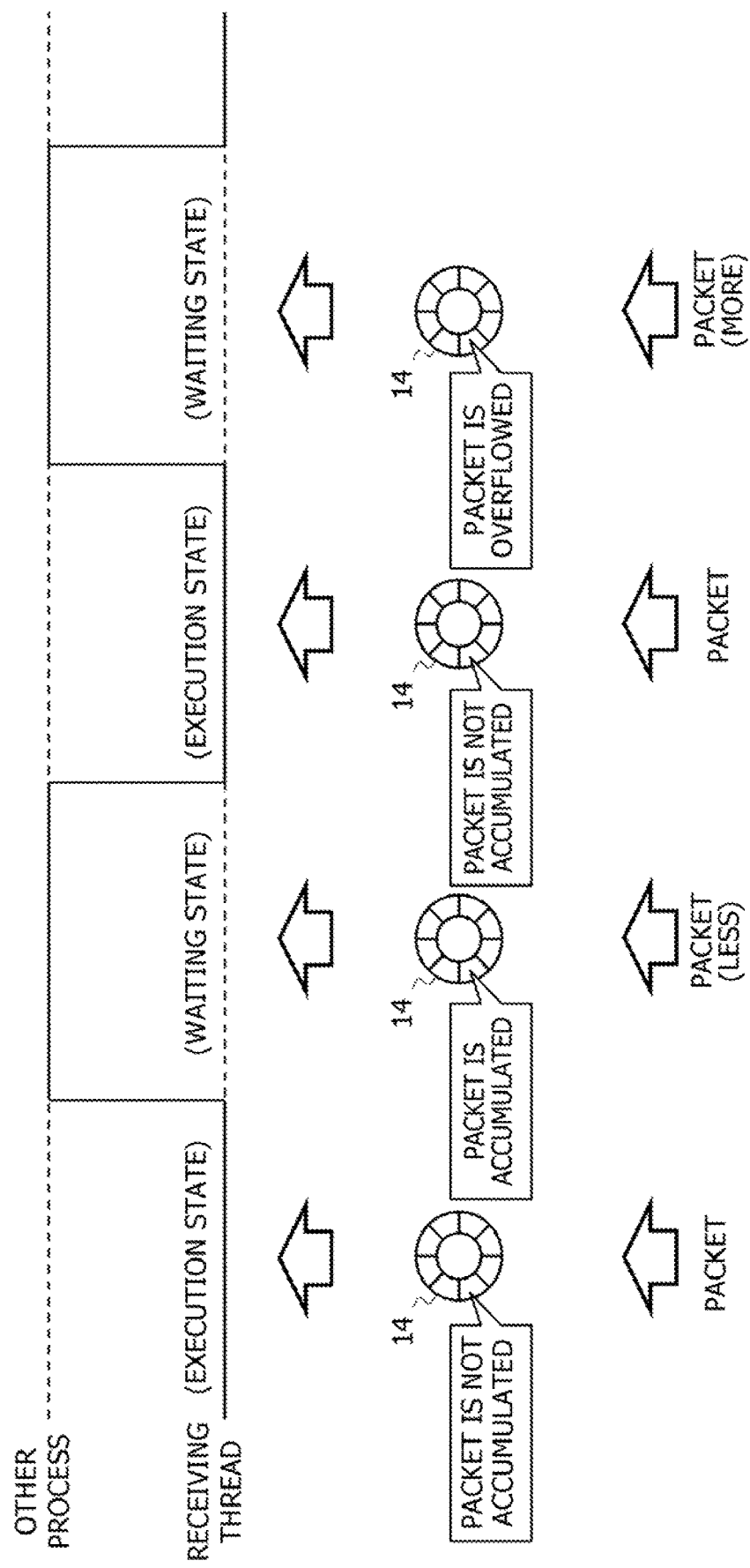
FIG. 15 is a diagram for explaining details of the abnormality detection processing according to the first embodiment.

In other words, for example, as illustrated in FIG. 15, in a case where the state of the receiving thread 12 is the execution state, the packet stored in the queue 14 is extracted by the receiving thread 12. Therefore, in the queue 14, in this case, the arrived packets are not accumulated.

On the other hand, as illustrated in FIG. 15, in a case where the state of the receiving thread 12 is the waiting state, the packet stored in the queue 14 is not extracted by the receiving thread 12. Therefore, in this case, the arrived packets are sequentially accumulated in the queue 14.

Then, for example, in a case where packets exceeding an allowable amount arrive at the queue 14 while the state of the receiving thread 12 is the waiting state, packet losses for newly arrived packets occur in the queue 14.

Therefore, it can be determined that the packet loss in the queue 14 is assumed to occur more easily as the waiting time of the receiving thread 12 is longer. Furthermore, it can be determined that the packet loss in the queue 14 more easily occurs as the arrival frequency of the packet (the number of arrivals) in the queue 14 is higher.

Therefore, for example, the degree calculation unit 112 calculates a product of the average time indicated by the average waiting time information 133 corresponding to each queue 14 and the arrival frequency indicated by the arrival frequency information 136 corresponding to each queue 14 as the occurrence degree of the packet loss in each queue (probability of occurrence of packet loss).

As a result, even in a case where it is not possible to acquire sufficient information from the OS 11 and the physical NIC 13, the degree calculation unit 112 can estimate the occurrence degree of the packet loss in each queue 14. Hereinafter, a specific example of the processing in S25 will be described.

[Specific Example of Processing in S25]

FIG. 16 is a diagram for explaining a specific example of the occurrence degree information 137.

Specifically, for example, "1.44 (ms)" set to the average waiting time information 133 illustrated in FIG. 11C. Furthermore, "43288" is set to the "arrival frequency 14a" in the arrival frequency information 136 illustrated in FIG. 14.

Therefore, in this case, the degree calculation unit 112 calculates "62344" calculated by multiplying "1.44 (ms)" by "43288" as the occurrence degree of the packet loss in the queue 14a.

Thereafter, for example, as illustrated in FIG. 16, the degree calculation unit 112 sets "62344" to an "occurrence degree 14a" that indicates the occurrence degree of the packet loss in the queue 14a in the occurrence degree information 137.

Returning to FIG. 10, the number of losses distribution unit 113 of the information processing device 1 calculates a total value of the occurrence degree indicated by the occurrence degree information 137 calculated in the processing in S25 (S31).

Specifically, for example, each of "62344", "64192", and "47482" is set to the occurrence degree information 137 illustrated in FIG. 16. Therefore, in this case, the number of losses distribution unit 113 calculates "174018" that is the total of "62344", "64192", and "47482".

Then, for each of multiple queues 14, the number of losses distribution unit 113 acquires a rate calculated by dividing the occurrence degree indicated by the occurrence degree information 137 of each queue 14 calculated in the processing in S25 by the total value calculated in the processing in S31 (S32).

Specifically, for example, "62344" is set to the "occurrence degree 14a" in the occurrence degree information 137 illustrated in FIG. 16. Therefore, for example, the number of losses distribution unit 113 calculates "0.358" calculated by dividing "62344" by "174018" as the rate corresponding to the queue 14a.

Subsequently, for each of multiple queues 14, the number of losses distribution unit 113 calculates a product of the rate corresponding to each queue 14 calculated in the processing in S32 and the number of packet losses indicated by the total number of losses information 138 acquired in the processing in S16 as the number of losses information 139 that indicates the number of packet losses corresponding to each queue 14 (S33).

In other words, for example, the number of losses distribution unit 113 distributes the number of packet losses occurred in the physical NIC 13 to each queue 14 so that the ratio of the numbers of packet losses occurred in the respective queues 14 is equal to the ratio of the occurrence degrees of the packet losses in the respective queues 14.

Figure 17:
FIG. 17 is a diagram for explaining details of the abnormality detection processing according to the first embodiment.

Specifically, as illustrated in FIG. 17, for example, each of "$m_1$", "$m_2$", and "$m_3$" is calculated so that a ratio of "$a_1$", "$a_2$", and "$a_3$" that are the occurrence degrees of the packet losses in the respective queues 14 is equal to a ratio of "$m_1$" "$m_2$", and "$m_3$" that are the numbers of packet losses occurred in the respective queues 14. Hereinafter, a specific example of the processing in S33 will be described.

[Specific Example of Processing in S33]

FIGS. 18A and 18B are diagrams for explaining specific examples of the total number of losses information 138 and the number of losses information 139. FIG. 18A is a diagram for explaining a specific example of the total number of losses information 138, and FIG. 18B is a diagram for explaining a specific example of the number of losses information 139.

Specifically, for example, "24" is set to the total number of losses information 138 illustrated in FIG. 18A. Therefore, for example, in a case where the rate acquired in the processing in S32 is "0.358", the number of losses distribution unit 113 calculates (estimate) "8.6" calculated by multiplying "24" by "0.358" as the number of packet losses occurred in the queue 14a.

Thereafter, the condition determination unit 114 of the information processing device 1 determines whether or not a correspondence relationship between the execution time indicated by the execution time information 134 acquired in the processing in S14 and the number of packet losses indicated by the number of losses information 139 calculated in the processing in S33 satisfies a condition for each of multiple receiving threads 12 (S34).

Specifically, for example, as described with reference to FIG. 4, the condition determination unit 114 determines whether or not the points P12a, P12b, and P12c respectively corresponding to the values indicating the behavior of each receiving thread 12 (execution time indicated by execution time information 134 corresponding to each receiving thread 12) and the numbers of packet losses occurred in the queue 14 corresponding to each receiving thread 12 are included in the region between the straight lines CCa and CCb for each of multiple receiving threads 12.

As a result, in a case where it is determined that there is a receiving thread 12 of which the correspondence relationship between the execution time indicated by the execution time information 134 acquired in the processing in S14 and the number of packet losses calculated in the processing in S33 satisfies the condition (YES in S35), the information output unit 115 of the information processing device 1 outputs the determination result information 140 that indicates that an abnormality occurs in the receiving thread 12 that is determined to satisfy the condition in the processing in S34 to the operation terminal 2 (S36).

Specifically, as illustrated in FIG. 4, for example, in a case where it is determined that the point P12b corresponding to the receiving thread 12b is not included in the region between the straight lines CCa and CCb, the condition determination unit 114 determines that an abnormality occurs in the receiving thread 12b. Then, in this case, the information output unit 115 outputs the determination result information 140 indicating that an abnormality occurs in the receiving thread 12b to the operation terminal 2.

On the other hand, in a case where it is determined that there is no receiving thread 12 of which the correspondence relationship between the execution time indicated by the execution time information 134 acquired in the processing in S14 and the number of packet losses calculated in the processing in S33 satisfies the condition (YES in S35), the information output unit 115 does not execute the processing in S36.

As described above, the information processing device 1 according to the present embodiment calculates the occurrence degree of the packet loss in each of the multiple queues 14 on the basis of the time when each of the multiple receiving threads 12 that receives packets is in the waiting state or the arrival frequency of the packets of each of the multiple queues 14 that stores the packets received by the multiple receiving threads 12.

Then, the information processing device 1 distributes the number of packet losses occurred in the physical NIC 13 in which the multiple queues 14 operates to each of the multiple queues 14 on the basis of the calculated occurrence degree.

Thereafter, the information processing device 1 determines whether or not an abnormality occurs in the multiple receiving threads 12 on the basis of a correspondence relationship between an operation state of each receiving thread 12 and the number of packet losses distributed to the queue 14 corresponding to each process among the multiple queues 14 for each of multiple receiving threads 12.

In other words, for example, the information processing device 1 according to the present embodiment estimates the number of packet losses occurred in each queue 14 from the information that can be acquired from the OS 11 and the physical NIC 13. Specifically, for example, the information processing device 1 estimates the number of packet losses occurred in each queue 14, for example, by combining the information that can be acquired from the OS 11 and the information that can be acquired from the physical NIC 13. Then, the information processing device 1 performs the anomaly detection on each receiving thread 12 using the estimated value of the number of packet losses in each queue 14.

As a result, the information processing device 1 according to the present embodiment can perform the anomaly detection on each receiving thread 12 even in a case where the physical NIC 13 compatible with a multi-queue is used. Therefore, the information processing device 1 can detect abnormality in the receiving thread 12 with high accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-based method of an abnormality detection performed by a computer equipped with a multi-queue network interface card (NIC) having multiple queues, the method comprising:

calculating, by a processor circuit of the computer, for each of the multiple queues included in the multi-queue NIC, an occurrence degree of a packet loss by multiplying a first time period in which a receiving process corresponding to that queue is in a waiting state and an arrival frequency of packets each received by the receiving process and stored into that queue, the receiving process being one of a plurality of processes each configured to receive a packet via the multi-queue NIC, each of the multiple queues being associated with any one of the plurality of processes;

distributing, by the processor circuit, the number of packet losses occurred in the multi-queue NIC to each of the multiple queues by multiplying, for each of the multiple queues, the calculated occurrence degree and the number of packet losses; and determining, by the processor circuit, for each of the multiple queues, whether an abnormality occurs in the receiving process corresponding to that queue, by comparing a range defined between an upper limit and a lower limit and a correspondence relationship between an operation state of the receiving process corresponding to that queue and the number of packet losses distributed to that queue.

2. The computer-based method according to claim 1, wherein the calculating of the occurrence degree of the packet loss is configured to:

acquire a total value of times when respective processes are in a waiting state within a predetermined period and a value indicating the number of times when an execution state of each process is switched to the waiting state within the predetermined period from each of the multiple processes; and calculate, as the first time period for each of the multiple processes, a time by dividing the total value that corresponds to the each of the multiple processes by the acquired value.

3. The computer-based method according to claim 1, wherein the calculating of the occurrence degree of the packet loss is configured to:

acquire a second time period in which each process is in an execution state within a predetermined period from each of the multiple processes;

acquire a total number of packets that have arrived at the communication device from the communication device;

calculate a rate of the second time period of each process with respect to a total value of the second time period for each of the multiple processes; and calculate, as the arrival frequency for each of the multiple queues, a product of the rate of the process that corresponds to each queue among the multiple processes and the total number of packets.

4. The computer-based method according to claim 1, wherein the calculating of the occurrence degree of the packet loss is configured to calculate, as the occurrence degree for each of the multiple queues, a product of the first time period regarding a process that corresponds to each queue among the multiple processes and the arrival frequency of each queue.

5. The computer-based method according to claim 1, wherein the communication device includes a physical network interface card.

6. The computer-based method according to claim 1, wherein the distributing of the number of packet losses is configured to:

acquire the number of packet losses from the communication device;

calculate a rate of the occurrence degree of each queue with respect to a total value of the occurrence degrees for each of the multiple queues; and calculate, as the number of packet losses that corresponds to each of the multiple queues, a product of the rate that corresponds to each queue and the number of packet losses.

7. The computer-based method according to claim 1, wherein the determining is configured to determine whether or not an abnormality occurs in each of the multiple processes on the basis of a correspondence relationship between a time when each process is in an execution state within a predetermined period and the number of packet losses distributed to the queue that corresponds to each process among the multiple queues, for each of the multiple processes.

8. The computer-based method according to claim 1, the method further comprising:

outputting information regarding a process determined that the correspondence relationship indicates occurrence of an abnormality from among the multiple processes.

9. A non-transitory computer-readable storage medium storing an abnormality detection program which causes a processor of a computer to perform processing, the computer being equipped with a multi-queue network interface card (NIC) having multiple queues, the processing including:

calculating, for each of the multiple queues included in the multi-queue NIC, an occurrence degree of a packet loss by multiplying a first time period in which a receiving process corresponding to that queue is in a waiting state and an arrival frequency of packets each received by the receiving process and stored into that queue, the receiving process being one of a plurality of processes each configured to receive a packet via the multi-queue NIC, each of the multiple queues being associated with any one of the plurality of processes;

distributing the number of packet losses occurred in the multi-queue NIC to each of the multiple queues by multiplying, for each of the multiple queues, the calculated occurrence degree and the number of packet losses; and determining, for each of the multiple queues, whether an abnormality occurs in the receiving process corresponding to that queue, by comparing a range defined between an upper limit and a lower limit and a correspondence relationship between an operation state of the receiving process corresponding to that queue and the number of packet losses distributed to that queue.

* * * * *